United States Patent
Endo et al.

(10) Patent No.: US 11,713,074 B2
(45) Date of Patent: Aug. 1, 2023

(54) MOTOR CONTROL DEVICE, CONTROL METHOD, MOTOR MODULE, AND ELECTRIC POWER STEERING APPARATUS

(71) Applicant: NIDEC CORPORATION, Kyoto (JP)

(72) Inventors: Shuji Endo, Kyoto (JP); Masaya Ishikawa, Kyoto (JP); Hiroaki Mizushima, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/547,150

(22) Filed: Dec. 9, 2021

(65) Prior Publication Data
US 2022/0185370 A1 Jun. 16, 2022

(30) Foreign Application Priority Data

Dec. 11, 2020 (JP) ................................. 2020-206252

(51) Int. Cl.
| | |
|---|---|
| *G05B 5/00* | (2006.01) |
| *H02H 7/08* | (2006.01) |
| *H02P 1/00* | (2006.01) |
| *H02P 3/00* | (2006.01) |
| *B62D 15/02* | (2006.01) |
| *H02P 21/22* | (2016.01) |
| *H02P 25/22* | (2006.01) |
| *H02P 29/028* | (2016.01) |
| *B62D 5/04* | (2006.01) |
| *H02P 27/12* | (2006.01) |

(52) U.S. Cl.
CPC .......... *B62D 15/021* (2013.01); *B62D 5/046* (2013.01); *H02P 21/22* (2016.02); *H02P 25/22* (2013.01); *H02P 27/12* (2013.01); *H02P 29/028* (2013.01); *B62D 5/0421* (2013.01)

(58) Field of Classification Search
CPC .......... H02P 21/22; H02P 25/22; H02P 27/12; B62D 5/021; B62D 5/046
USPC ......................................................... 318/446
See application file for complete search history.

(56) References Cited

U.S. PATENT DOCUMENTS

| | | |
|---|---|---|
| 6,262,547 B1 | 7/2001 | Kifuku et al. |
| 8,160,777 B2 | 4/2012 | Tamaizumi |
| 11,063,545 B2 * | 7/2021 | Koikegami ............. H02M 1/32 |

(Continued)

FOREIGN PATENT DOCUMENTS

JP 5082947 B2 11/2012

*Primary Examiner* — Erick D Glass
(74) *Attorney, Agent, or Firm* — Hauptman Ham, LLP

(57) ABSTRACT

To improve steering feeling felt by a driver, a motor control device includes a processor and a memory which stores a program for controlling an operation of the processor. According to the program, the processor executes: switching from n-phase (n is an integer of three or more) energization control to n−1 phase energization control in response to a switching signal; acquiring a torque command value, an electrical angle of a motor, and an actual current value of the motor; generating a pre-current command value on the basis of the torque command value, the electrical angle of the motor, and the actual current value of the motor which are acquired; generating a current command value by applying dither control to the pre-current command value in a dead point range of an electrical angle range from 0 to 2π; and performing the n−1 phase energization control on the basis of the current command value.

12 Claims, 14 Drawing Sheets

(56) References Cited

U.S. PATENT DOCUMENTS

| | | | |
|---|---|---|---|
| 2007/0296375 A1* | 12/2007 | Sakaguchi | H02P 29/032 318/811 |
| 2008/0297077 A1* | 12/2008 | Kovudhikulrungsri | H02P 21/22 318/689 |
| 2009/0132126 A1 | 5/2009 | Tamaizumi | |
| 2020/0382032 A1* | 12/2020 | Takase | H02P 27/08 |

* cited by examiner

MOTOR CONTROL DEVICE, CONTROL METHOD, MOTOR MODULE, AND ELECTRIC POWER STEERING APPARATUS

CROSS-REFERENCE TO RELATED APPLICATIONS

The present invention claims priority under 35 U.S.C. § 119 to Japanese Patent Application No. 2020-206252 filed on Dec. 11, 2020, the entire content of which is incorporated herein by reference.

FIELD OF THE INVENTION

The present disclosure relates to a motor control device, a control method, a motor module, and an electric power steering apparatus.

BACKGROUND

A general automobile is mounted with an electric power steering apparatus (EPS) including an electric motor (hereinafter, referred to simply as a "motor") and a motor control device. The electric power steering apparatus is an apparatus that assists the steering wheel operation of a driver by driving the motor.

There has been developed a technique for assisting the steering wheel operation of the driver by continuing motor driving even in a case where a defect occurs in a part of a motor or an inverter mounted on the electric power steering apparatus. Examples of the defect include disconnection of a winding of the motor or a failure of a switch element included in the inverter. In a case where such a defect only affects a power supply to a specific winding, it is possible to continue the motor driving by continuing to supply power to the remaining normal windings.

Conventionally, an electric power steering apparatus is capable of continuing assistance by normally performing energization control to conduct windings of three phases and performing energization control to energize the remaining normal windings of two phases in a case where an energization failure occurs in any phase of the windings of a motor. In the electric power steering apparatus, a rotation angular velocity of the motor increases by executing an acceleration control in a deceleration section in which a steering speed is decelerated when a generated motor torque falls below an assist force target value. Accordingly, it is possible to suppress non-smoothness felt by the driver in the steering operation in the deceleration section.

In a case where a defect occurs in a motor or an inverter, it is desirable to improve steering feeling felt by a driver when the assistance of the steering wheel operation of the driver is continued.

SUMMARY

In a non-limitative and exemplary embodiment, a control device of the present disclosure is a control device, which is used in an electric power steering apparatus including a motor having n-phase (n is an integer of three or more) windings, for controlling the motor. N-phase energization control of energizing the n-phase windings or n−1 phase energization control of energizing n−1 phase windings is able to be performed. The device includes: a processor; and a memory that stores a program for controlling an operation of the processor. The processor executes, according to the program, switching from the n-phase energization control to the n−1 phase energization control in response to a switching signal, acquiring a torque command value, an electrical angle of the motor, and an actual current value of the motor, generating a pre-current command value on the basis of the torque command value, the electrical angle of the motor, and the actual current value of the motor which are acquired, generating a current command value by applying dither control to the pre-current command value in a dead point range of an electrical angle range from 0 to 2π, and performing the n−1 phase energization control on the basis of the current command value.

In a non-limitative and exemplary embodiment, a motor module of the present disclosure includes a motor and the control device described above.

In a non-limitative and exemplary embodiment, an electric power steering apparatus of the present disclosure includes the motor module described above.

In a non-limitative and exemplary embodiment, a control method of the present disclosure is a control method, which is used in an electric power steering apparatus including a motor having n-phase (n is an integer of three or more) windings, for controlling the motor. N-phase energization control of energizing the n-phase windings or n−1 phase energization control of energizing n−1 phase windings is able to be applied to the motor. The method includes: switching from the n-phase energization control to the n−1 phase energization control in response to a switching signal; acquiring a torque command value, an electrical angle of the motor, and an actual current value of the motor; generating a pre-current command value on the basis of the torque command value, the electrical angle of the motor, and the actual current value of the motor which are acquired; generating a current command value by applying dither control to the pre-current command value in a dead point range of an electrical angle range from 0 to 2π; and performing the n−1 phase energization control on the basis of the current command value.

The above and other elements, features, steps, characteristics and advantages of the present disclosure will become more apparent from the following detailed description of the preferred embodiments with reference to the attached drawings.

DETAILED DESCRIPTION

As a result of examination by the present inventors, it has been found that, in a case where a steering angle of a steering wheel is to be maintained in the deceleration section, chattering occurs in a motor current, a motor torque vibrates, and as a result, vibration may occur in the steering wheel. This unintended vibration deteriorates steering feeling felt by a driver. Even when the acceleration control is executed, it is difficult to prevent this deterioration.

The present inventors have found that the deterioration of the steering feeling can be suppressed by applying dither control to calculation of a current command value, and have completed the present invention.

Hereinafter, embodiments of a motor control device, which is mounted on an electric power steering apparatus, a control method, a motor module including the control device, and the electric power steering apparatus including the motor module according to the present disclosure will be described in detail with reference to the accompanying drawings. However, needlessly detailed descriptions may be omitted. For example, detailed descriptions of well-known matters and duplicate description of substantially the same configuration may be omitted. This is to avoid unnecessary redundancy of the following description and to facilitate the understanding of those skilled in the art.

The following embodiments are illustrative, and the motor control device, which is mounted on the electric power steering apparatus, and the control method according to the present disclosure are not limited to the following embodiments. For example, the numerical values, the steps, the order of the steps, and the like illustrated in the following embodiments are only illustrative, and various modifications can be made unless any technical inconsistency occurs. The embodiments described below are illustrative, and various combinations are possible unless any technical inconsistency occurs.

Figure 1:
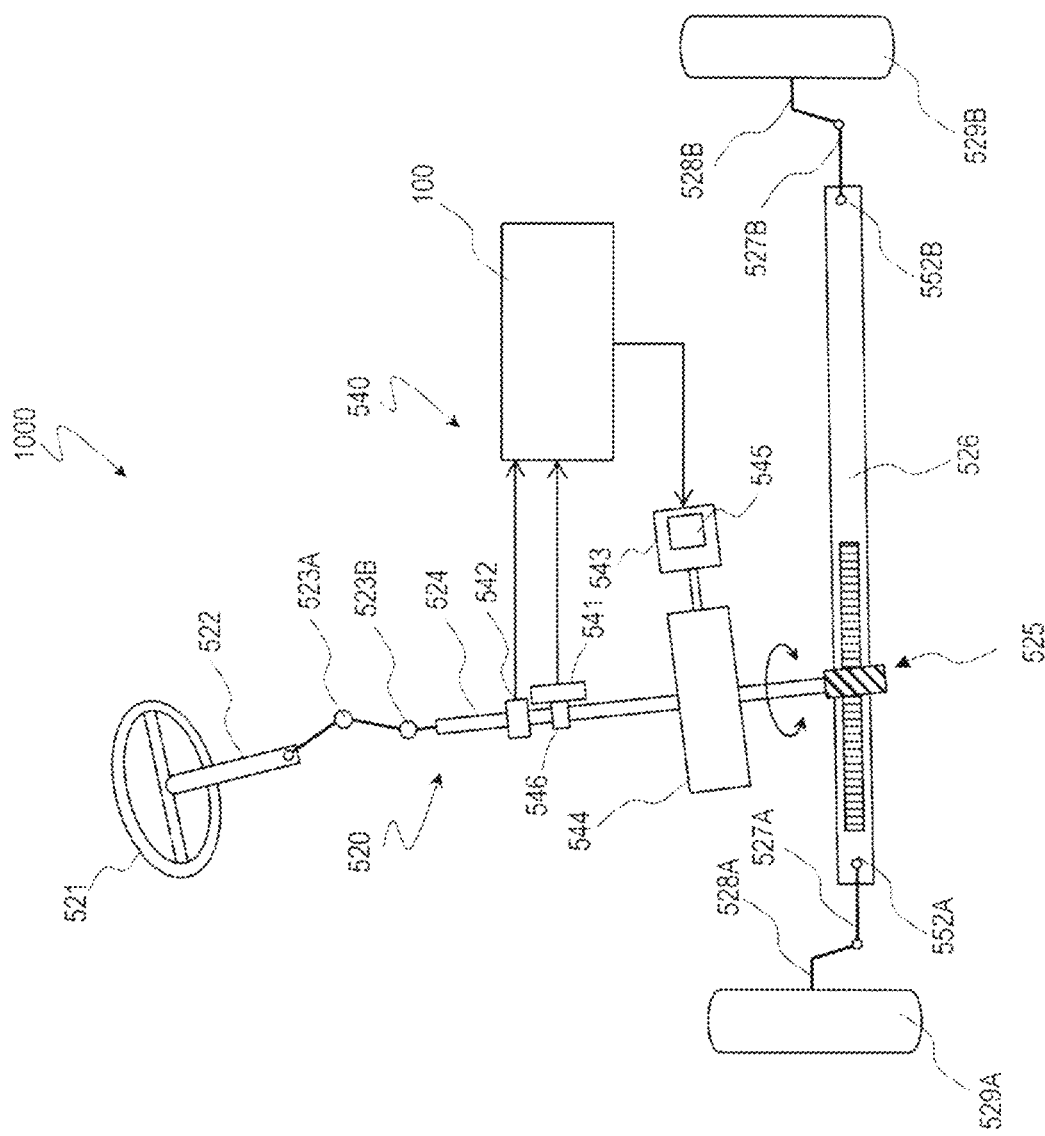
FIG. 1 is a diagram schematically illustrating a configuration example of an electric power steering apparatus according to an embodiment of the present disclosure.

FIG. 1 is a diagram schematically illustrates a configuration example of an electric power steering apparatus 1000 according to the present embodiment.

The electric power steering apparatus 1000 (hereinafter, referred to as an "EPS") includes a steering system 520 and an assist torque mechanism 540 which generates an assist torque. The EPS 1000 generates the assist torque for assisting the steering torque of the steering system generated when a driver operates a steering wheel. The assist torque reduces an operation load on the driver.

The steering system 520 includes a steering wheel 521, a steering shaft 522, universal joints 523A and 523B, a rotary shaft 524, a rack and pinion mechanism 525, a rack shaft 526, right and left ball joints 552A and 552B, tie rods 527A and 527B, knuckles 528A and 528B, and right and left steered wheels 529A and 529B, for example.

The assist torque mechanism 540 includes a steering torque sensor 541, a steering angle sensor 542, an electronic control unit (ECU) 100 for automobiles, a motor 543, a deceleration gear 544, an inverter 545, and a torsion bar 546, for example. The steering torque sensor 541 detects a steering torque in the steering system 520 by detecting the amount of torsion of the torsion bar 546. The steering angle sensor 542 detects a steering angle of the steering wheel. Incidentally, the steering torque may be an estimation value derived from calculation, not a value of the steering torque sensor. The steering angle can also be calculated on the basis of the output value of the angle sensor.

The ECU 100 generates a motor driving signal on the basis of the detection signals detected by the steering torque sensor 541, the steering angle sensor 542, a vehicle speed sensor (not illustrated) mounted on a vehicle, or the like, and outputs the motor driving signal to the inverter 545. For example, the inverter 545 converts direct-current power into three-phase alternating-current power having U-phase, V-phase, and W-phase pseudo sine waves in accordance with the motor driving signal and supplies the power to the motor 543. The motor 543 is, for example, a surface permanent-magnet synchronous motor (SPMSM) or a switched reluctance motor (SRM), and is supplied with the three-phase alternating-current power to generate assist torque corresponding to the steering torque. The motor 543 transmits the generated assist torque to the steering system 520 via the deceleration gear 544. Hereinafter, the ECU 100 will be referred to as a control device 100 for the EPS.

The control device 100 and the motor are modularized and manufactured and sold as a motor module. The motor module includes the motor and the control device 100 and is suitably used for the EPS. Alternatively, the control device 100 may be manufactured and sold as a control device for controlling the EPS independently of the motor.

Figure 2:
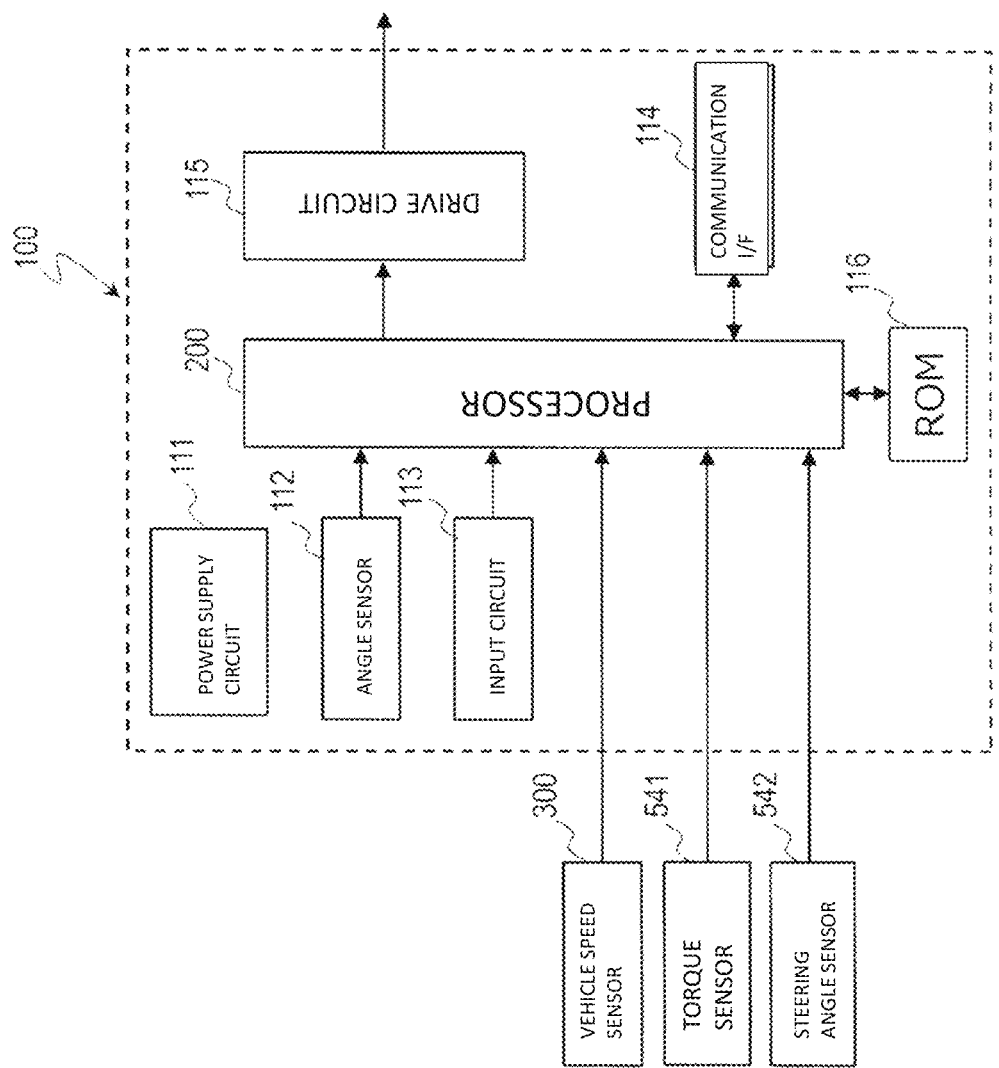
FIG. 2 is a block diagram illustrating a typical example of a configuration of a control device according to the embodiment of the present disclosure.

FIG. 2 is a block diagram illustrating a typical example of a configuration of the control device 100 according to the present embodiment. The control device 100 includes a power supply circuit 111, an angle sensor 112, an input circuit 113, a communication I/F 114, a drive circuit 115, a ROM 116, and a processor 200, for example. The control device 100 can be realized as a printed circuit board (PCB) on which these electronic components are implemented.

A vehicle speed sensor 300 mounted on the vehicle, the steering torque sensor 541, and the steering angle sensor 542 are electrically connected to the processor 200. The vehicle speed sensor 300, the steering torque sensor 541, and the steering angle sensor 542 transmit a vehicle speed, a steering torque, and a steering angle to the processor 200, respectively.

The control device 100 is electrically connected to the inverter 545 (see FIG. 1). The control device 100 controls switching operations of a plurality of switch elements (for example, MOSFETs) included in the inverter 545. Specifically, the control device 100 generates control signals (hereinafter referred to as "gate control signals") for controlling the switching operations of the respective switch elements and outputs the gate control signals to the inverter 545.

The control device 100 generates a torque command value on the basis of a torsion torque or the like, and controls the torque and rotation speed of the motor 543 by means of, for example, vector control. The control device 100 can perform not only the vector control but also other closed-loop control. The rotation speed is expressed as the number of times of rotation (rpm) of a rotor per unit time (for example, one minute) or the number of times of rotation (rps) of the rotor per unit time (for example, one second). The vector control is a method in which current flowing through the motor is separated into a current component that contributes to generation of a torque and a current component that contributes to generation of a magnetic flux, and the current components orthogonal to each other are independently controlled.

The power supply circuit 111 is connected to an external power supply (not illustrated) and generates DC voltage required for each block in the circuit. The DC voltage to be generated is, for example, 3 V or 5 V.

The angle sensor 112 is, for example, a resolver or a Hall IC. Alternatively, the angle sensor 112 is also realized by a combination of an MR sensor having a magnetoresistive (MR) element and a sensor magnet. The angle sensor 112 detects a rotation angle of the rotor and outputs the rotation angle to the processor 200. The control device 100 may include a speed sensor and an acceleration sensor for detecting the rotation speed and acceleration of the motor instead of the angle sensor 112.

The input circuit 113 receives a motor current value (hereinafter, referred to as an "actual current value") detected by a current sensor (not illustrated), converts the level of the actual current value into the input level for the processor 200 as needed, and outputs the actual current value to the processor 200. A typical example of the input circuit 113 is an analog-digital conversion circuit.

The processor 200 is a semiconductor integrated circuit and is also referred to as a central processing unit (CPU) or a microprocessor. The processor 200 sequentially executes a computer program which is stored in the ROM 116 and describes a command set for controlling motor driving, and realizes desired processing. The processor 200 is widely interpreted as a term including a field programmable gate array (FPGA), an application specific integrated circuit (ASIC), or an application specific standard product (ASSP) mounted with a CPU. The processor 200 sets a current command value according to the actual current value, the rotation angle of the rotor, and the like, generates a pulse width modulation (PWM) signal, and outputs the PWM signal to the drive circuit 115.

The communication I/F 114 is an input/output interface for transmitting/receiving data in conformity with an in-vehicle control area network (CAN), for example.

The drive circuit 115 is typically a gate driver (or a pre-driver). The drive circuit 115 generates a gate control signal in accordance with the PWM signal and gives the gate control signal to the gates of the plurality of switch elements included in the inverter 545. When a driving target is a motor which can be driven at low voltage, the gate driver may not always be required. In this case, the functionality of the gate driver may be implemented in the processor 200.

The ROM 116 is electrically connected to the processor 200. The ROM 116 is a writable memory (for example, a PROM), a rewritable memory (for example, a flash memory or an EEPROM), or a read-only memory, for example. The ROM 116 stores a control program including a command set for causing the processor 200 to control motor driving. For example, the control program is temporarily expanded to a RAM (not illustrated) at boot time.

Figure 3:
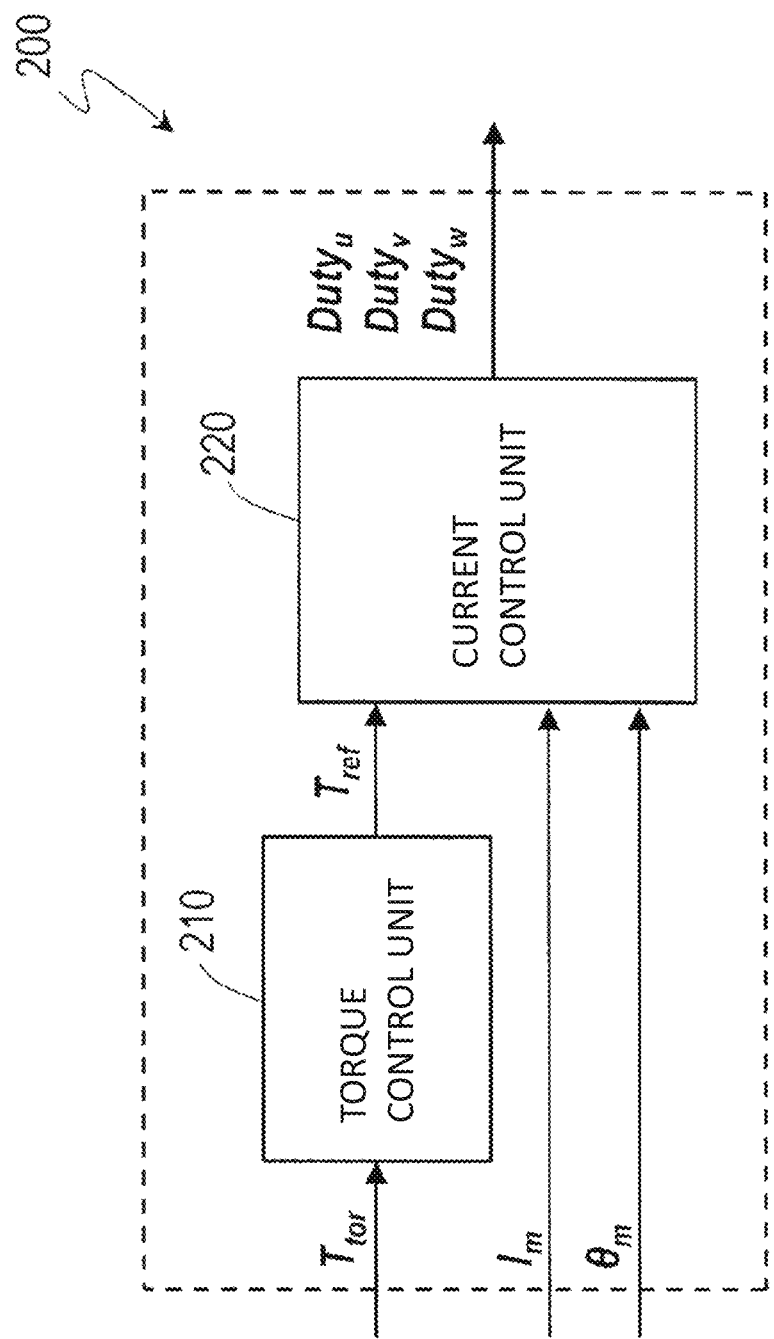
FIG. 3 is a functional block diagram exemplifying functional blocks of processing executed by a processor of the control device according to the embodiment of the present disclosure.

FIG. 3 is a functional block diagram exemplifying functional blocks of processes (or tasks) executed by the processor 200 of the control device 100 according to the exemplary embodiment of the present disclosure. The processor 200 in the exemplary embodiment of the present disclosure may be realized by a plurality of functional blocks including a torque control unit 210 and a current control unit 220.

A torsion torque $T_{tor}$ detected by the steering torque sensor 541 is input to the torque control unit 210. The torque control unit 210 generates a torque command value $T_{ref}$ on the basis of the torsion torque $T_{tor}$.

The motor according to the present embodiment is a three-phase motor in which windings are star-connected to each other. Phase currents flowing through the U phase, the V phase, and the W phase are detected as actual current values $I_m$ by the current sensor. The actual current value $I_m$, an electrical angle $\theta_m$ of the motor, and the torque command value $T_{ref}$ are input to the current control unit 220. The current control unit 220 calculates duty command values $Duty_u$, $Duty_v$, and $Duty_w$ for respective U, V, and W phases on the basis of the actual current value $I_m$, the electrical angle $\theta_m$ of the motor, and the torque command value $T_{ref}$, and outputs the calculated values to the drive circuit 115. Incidentally, the functions of the torque control unit 210 and the current control unit 220 will be described in detail later.

The processing of each functional block is typically described in a computer program in units of software modules and stored in the ROM 116. However, in a case of using the FPGA or the like, all or part of these functional blocks can be implemented as hardware accelerators.

In a case in which each functional block is implemented as software (or firmware) in the control device 100, a device which executes the software may be the processor 200. In one aspect, the motor control device according to the present disclosure includes the processor 200 and a memory 116 which stores a program for controlling the operation of the processor 200. The processor 200 executes, according to the program, (1) switching from a three-phase energization control to a two-phase energization control in response to a switching signal, (2) acquiring a torque command value, an electrical angle of the motor, and an actual current value of the motor, (3) generating a pre-current command value on the basis of the acquired torque command value, the electrical angle of the motor, and the actual current value of the motor, (4) generating a current command value by applying dither control to the pre-current command value in a dead point range of an electrical angle range from 0 to $2\pi$, and (5) performing the two-phase energization control on the basis of the current command value.

In a case where each functional block is implemented as software and/or hardware in the control device 100, in another aspect, the motor control device 100 of the present disclosure switches from a three-phase energization control to a two-phase energization control in response to a switching signal output from a failure detection unit 224, and performs the two-phase energization control on the basis of a current command value calculated by a current command value calculation unit 221 included in the current control unit 220. The current command value calculation unit 221 includes a pre-current command value calculation unit 221*a* which acquires a torque command value, an electrical angle of the motor, and an actual current value of the motor, and generates a pre-current command value on the basis of the torque command value, the electrical angle of the motor, and the actual current value of the motor which are acquired, and a dither control unit 221*b* which generates a current command value by applying dither control to the pre-current command value in a dead point range of an electrical angle range from 0 to $2\pi$.

Figure 4:
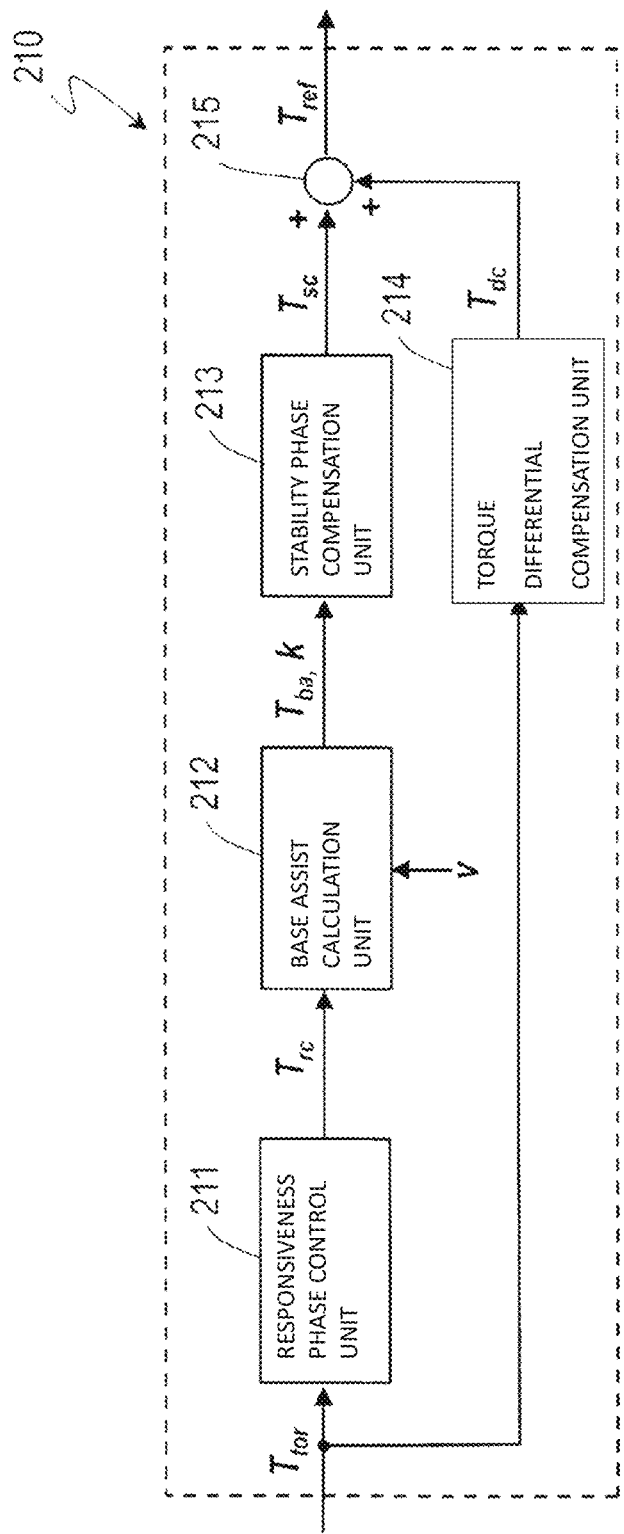
FIG. 4 is a functional block diagram illustrating a configuration example of a torque control unit.

FIG. 4 is a functional block diagram illustrating a configuration example of the torque control unit 210.

In the illustrated example, the torque control unit 210 includes a responsiveness phase control unit 211, a base assist calculation unit 212, a stability phase compensation unit 213, a torque differential compensation unit 214, and an adder 215.

The responsiveness phase control unit 211 adjusts an assist gain within a possible range of a steering frequency when the driver operates the steering wheel, and compensates for the rigidity of the torsion bar. In the present embodiment, an example of the above range is 5 Hz or less. The responsiveness phase control unit 211 acquires the torsion torque $T_{tor}$. The responsiveness phase control unit 211 generates a responsiveness phase compensation torque $T_{rc}$ by applying a first-order phase compensation to the torsion torque $T_{tor}$ when the steering frequency is 5 Hz or less. The first-order phase compensation is represented by a transfer function of a mathematical expression of Expression 1.

$$C(s) = \frac{\frac{1}{2\pi f_1}s + 1}{\frac{1}{2\pi f_2}s + 1} \quad \text{[Expression 1]}$$

Here, s is a Laplace transformer, $f_1$ is a frequency (Hz) for determining the zero point of the transfer function, and $f_2$ is a frequency (Hz) for determining the pole of the transfer function. A graph in which the gain (or loop gain) is set as a vertical axis and the logarithm of the frequency is set as a horizontal axis is called a gain diagram. In the gain diagram, the zero point means the intersection of the gain curve and the horizontal axis indicating 0 dB, and the pole means the maximum point of the gain curve. For example, by setting the pole frequency to be higher than the zero point frequency, a phase lead compensation can be applied. The longer the distance between the frequencies is, the larger the amount of phase lead becomes.

The base assist calculation unit 212 acquires the responsiveness phase compensation torque $T_{rc}$ and a vehicle speed v as input data. The base assist calculation unit 212 generates a base assist torque $T_{ba}$ on the basis of the responsiveness phase compensation torque $T_{rc}$ and the vehicle speed v. For example, the base assist calculation unit 212 may have a lookup table (LUT) which defines a correspondence between the responsiveness phase compensation torque $T_{rc}$, the vehicle speed v, and the base assist torque $T_{ba}$. The base assist calculation unit 212 can determine the base assist torque $T_{ba}$ in the correspondence relationship on the basis of the responsiveness phase compensation torque $T_{rc}$ and the vehicle speed v with reference to the LUT. Further, the base assist calculation unit 212 can determine a base assist gain k on the basis of a slope defined by a ratio of a variation amount of the base assist torque $T_{ba}$ to a variation amount of the responsiveness phase compensation torque $T_{rc}$.

The stability phase compensation unit 213 acquires the base assist torque $T_{ba}$ and the base assist gain k as input data. The stability phase compensation unit 213 generates a stability phase compensation torque $T_{Sc}$ on the basis of the base assist torque $T_{ba}$ and the base assist gain k. The stability phase compensation unit 213 can apply stability phase compensation to the base assist torque $T_{ba}$ by using, for example, a stabilization compensator. The stabilization compensator may have a second-order or higher transfer function in which a frequency characteristic is variable in accordance with the base assist gain k. The second-order or higher transfer function is expressed using a responsiveness parameter ω and a damping parameter ζ. The second-order or higher transfer function can be expressed by, for example, a mathematical expression of Expression 2. By setting the order number of the transfer function to two, damping can be given to the characteristic of the transfer function. A phase characteristic can be adjusted by changing the damping.

$$C_{sc}(s) = \frac{s^2 + 2\zeta_1\omega_1 s + \omega_1^2}{s^2 + 2\zeta_2\omega_2 s + \omega_2^2}\left(\frac{\omega_2^2}{\omega_1^2}\right) \quad \text{[Expression 2]}$$

Here, s is a Laplace transformer, $\omega_1$ is a zero point frequency, $\omega_2$ is a pole frequency, $\zeta_1$ is zero point damping, and $\zeta_2$ is pole damping. In the gain diagram, the zero point means the intersection of the gain curve and the horizontal axis indicating 0 dB, and the pole means the maximum point of the gain curve. The pole frequency $\omega_2$ is lower than the zero point frequency $\omega_1$.

The torque differential compensation unit 214 calculates a differential compensation torque $T_{dc}$ on the basis of the temporal change amount of the torsion torque $T_{tor}$. The torque differential compensation unit 214 can calculate the differential compensation torque $T_{dc}$ on the basis of, for example, a transfer function represented by a mathematical expression of Expression 3. Here, T is a time constant.

$$G(s) = \frac{s}{1 + Ts} \quad \text{[Expression 3]}$$

The adder 215 generates the torque command value $T_{ref}$ on the basis of the stability phase compensation torque $T_{Sc}$ and the differential compensation torque $T_{dc}$. More specifically, the adder 215 adds the differential compensation torque $T_{dc}$ to the stability phase compensation torque $T_{Sc}$ to generate the torque command value $T_{ref}$.

According to the torque control unit 210 described above, the responsiveness of the motor torque to the torsion torque can be enhanced by applying a torque differential compensation and a phase lead compensation. As a result, a rapid output variation of the motor torque which may occur after a dead point described later is suppressed, and the steering feeling can be improved.

Figure 5:
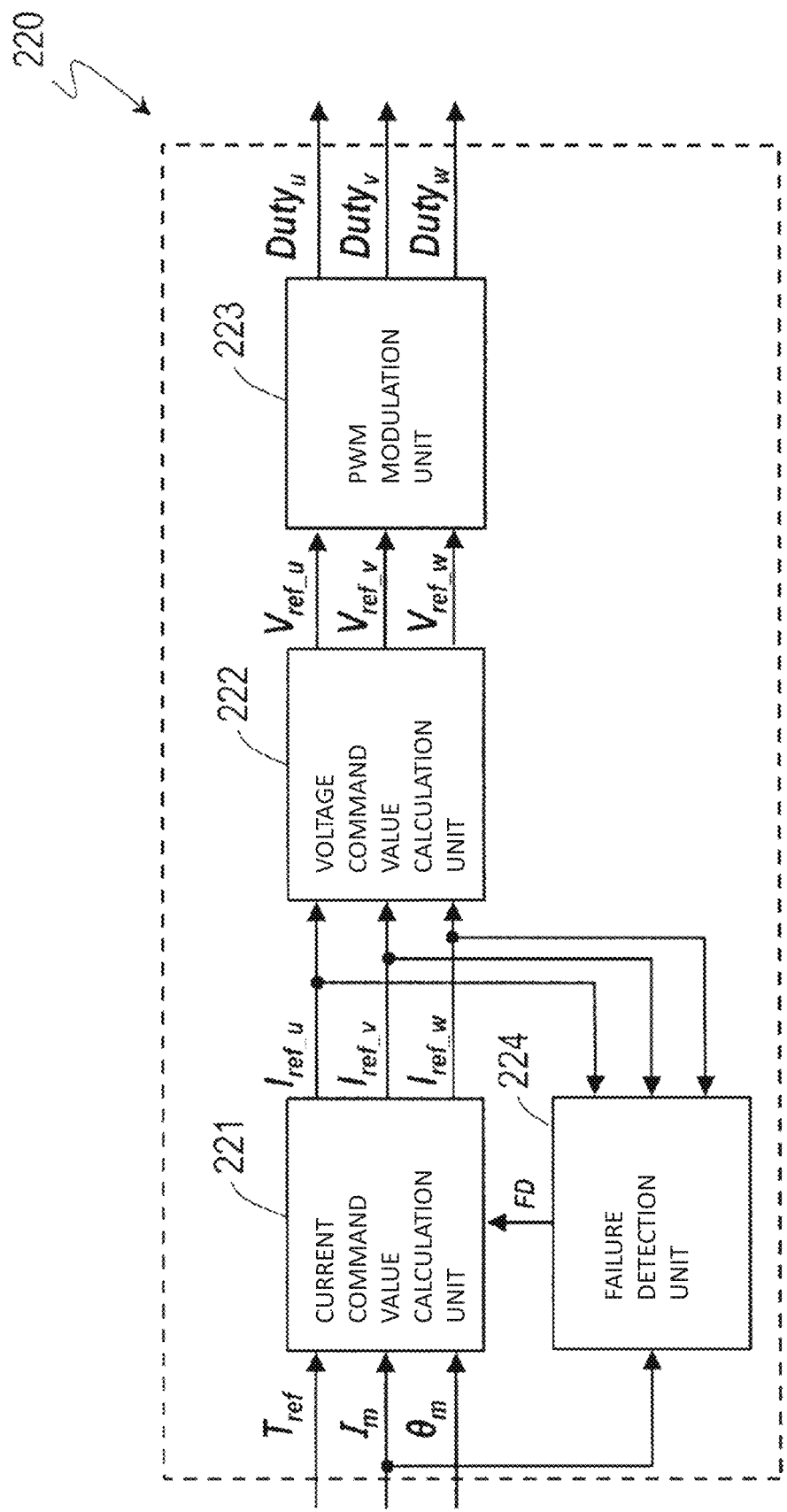
FIG. 5 is a functional block diagram illustrating a configuration example of a current control unit.
Figure 6:
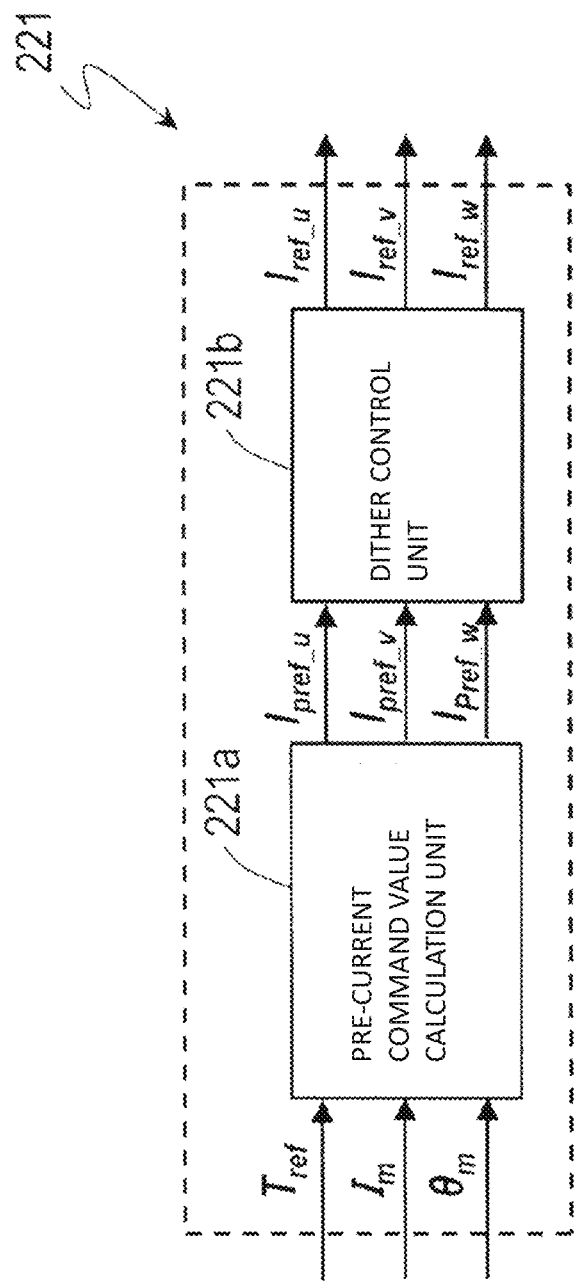
FIG. 6 is a functional block diagram illustrating a configuration example of a current command value calculation unit.

FIG. 5 is a functional block diagram illustrating a configuration example of the current control unit 220. FIG. 6 is a functional block diagram illustrating a configuration example of the current command value calculation unit 221.

In the illustrated example, the current control unit 220 includes the current command value calculation unit 221, a voltage command value calculation unit 222, a PWM modulation unit 223, and the failure detection unit 224. The current control unit 220 calculates a voltage command value $V_{ref}$ on the basis of the torque command value $T_{ref}$, for example, in accordance with vector control. The current control unit 220 generates a duty command value Duty which is a PWM signal on the basis of the voltage command value $V_{ref}$ and outputs the duty command value Duty to the drive circuit 115.

On the basis of the current command value $I_{ref}$, the current control unit 220 performs three-phase energization control to energize windings of three phases in control in a normal state, and performs two-phase energization control to energize windings of two phases out of the three phases in control in an abnormal state.

First, failure detection in the present embodiment will be described.

In the present embodiment, the current control unit 220 can energize the windings of the motor according to a control mode including control in the normal state and control in the abnormal state. For example, the normal state means a state in which a defect such as disconnection of a winding or an open or short circuit failure of a switch element included in an inverter does not occur. The abnormal state means a state in which the above-described defect occurs.

The current control unit 220 can perform three-phase energization control to energize the three-phase windings when control in the normal state is selected as the control mode, and can perform two-phase energization control to energize the two-phase windings when control in the abnormal state is selected as the control mode.

The failure detection unit 224 monitors whether or not there is a winding which cannot be energized among the three-phase windings, and detects a failure of the winding or a switch element included in the inverter. As an example of failure detection, the failure detection unit 224 can detect a failure of the winding or the switch element for each phase on the basis of each difference between three-phase phase currents $I_u$, $I_v$, and $I_w$ and three-phase current command values $I_{ref\_u}$, $I_{ref\_v}$, and $I_{ref\_w}$. Each of the three-phase phase currents can be detected by, for example, a shunt resistor included in a leg of each phase of the inverter. As another example of the failure detection, the failure detection unit 224 can estimate a current value and specify a failure phase. Alternatively, the failure detection unit 224 can detect a failure of the switch element by monitoring a drain-source voltage $V_{ds}$ of the switch element (typically, MOSFET) and comparing a predetermined threshold voltage with $V_{ds}$. However, the failure detection is not limited to the above methods, and any known method related to the failure detection may be widely used.

The failure detection is not necessarily performed by the processor 200 mounted on the ECU (control device 100) for controlling the motor, and may be performed by, for example, a processor mounted on another ECU communicably connected to the processor 200 via the CAN.

The failure detection unit 224 generates a failure detection signal FD in response to detection of a failure of a phase which cannot be energized. When detecting a failure of the winding or the switch element, the failure detection unit 224 notifies the current command value calculation unit 221 of the failure detection signal FD. The current command value calculation unit 221 receives the failure detection signal FD as a switching signal. For example, when the failure detection signal FD is asserted, the current command value calculation unit 221 switches the motor control of the control device 100 from the three-phase energization control to the two-phase energization control in response to the assertion.

For example, when detecting a failure of a high-side switch element included in a U-phase leg of the inverter, the failure detection unit 224 asserts the failure detection signal FD. This failure is referred to as a U-phase failure. In response to the asserted failure detection signal FD, the current command value calculation unit 221 switches from the three-phase energization control to two-phase energization control in which the windings of the V and W phases other than the U phase among the three phases are energized. Similarly, when detecting a failure of a high-side switch element included in a V-phase leg of the inverter, for example, the failure detection unit 224 asserts the failure detection signal FD. This failure is referred to as a V-phase failure. In response to the asserted failure detection signal FD, the current command value calculation unit 221 switches from the three-phase energization control to two-phase energization control in which the U-phase and W-phase windings other than the V-phase among the three phases are energized. For example, when a failure of a high-side switch element included in a W-phase leg of the inverter is detected, the failure detection unit 224 asserts the failure detection signal FD. This failure is referred to as a W-phase failure. In response to the asserted failure detection signal FD, the current command value calculation unit 221 switches from the three-phase energization control to two-phase energization control in which the U-phase and V-phase windings other than the W-phase among the three phases are energized.

In the illustrated example, the current command value calculation unit 221 includes the pre-current command value calculation unit 221a and the dither control unit 221b.

The current command value calculation unit 221 acquires the actual current value $I_m$ of the motor including the torque command value $T_{ref}$, the electrical angle $\theta_m$ of the motor, and the three-phase phase currents $I_u$, $I_v$, and $I_w$. The current command value calculation unit 221 calculates three-phase current command values $I_{ref\_u}$, $I_{ref\_v}$, and $I_{ref\_w}$, on the basis of the torque command value $T_{ref}$, the electrical angle $\theta_m$ of the motor, and the three-phase phase currents $I_u$, $I_v$, and $I_w$ which are acquired.

When the control device 100 performs the motor control in the normal state, the output of the three-phase motor can be expressed by, for example, a mathematical expression of Expression 4. The phase voltages of the U, V, and W phases are expressed by mathematical expressions of Expressions 5, 6, and 7, respectively. Here, T is a motor torque [Nm], Pn is the number of pole pairs, $\Psi_f$ is a flux linkage [wb], and $\omega$ is an angular velocity [rad/s] of the electrical angle $\theta_m$ of the motor. $\Psi_f$ is represented by the product ($I_m \cdot L$) of the actual current value $I_m$ of the motor and a reactance L of the motor. $\omega$ is obtained by time-differentiating $\theta_m$.

$$T_\omega = P_n(i_u e_u + i_v e_v + i_w e_w) \qquad \text{[Expression 4]}$$

$$e_u = \Psi_f \omega \sin\theta \qquad \text{[Expression 5]}$$

$$e_v = \Psi_f \omega \sin(\theta + 2/3\pi) \qquad \text{[Expression 6]}$$

$$e_w = \Psi_f \omega \sin(\theta - 2/3\pi) \qquad \text{[Expression 7]}$$

In the present embodiment, an example of motor control in the abnormal state in which two-phase energization control of energizing the V and W-phase windings is performed assuming that a defect occurs in energization of the U phase among the U, V, and W phases will be described. In this two-phase energization control, each phase current is given by a mathematical expression of Expression 8. $i_{2phase}$ is a phase current flowing through the U phase and the V phase, and corresponds to the actual current value $I_m$ of the motor.

$$i_u = 0, i_v = -i_w = i_{2phase} \qquad \text{[Expression 8]}$$

When Expressions 5 to 8 are applied to Expression 4 and organized, a mathematical expression of Expression 9 is obtained. Further, when Expression 9 is organized for the $i_{2phase}$, a mathematical expression of Expression 10 is obtained. Here, φ is a phase offset [rad]. When a defect occurs in the energization of the U phase, φ=0. When a defect occurs in the energization of the V phase, φ=π/3. When a defect occurs in the energization of the W phase, φ=−π/3.

$$T = P_n i_{2phase} \Psi_f \left[ \sin\left(\theta + \frac{2}{3}\pi\right) - \sin\left(\theta - \frac{2}{3}\pi\right) \right] \quad \text{[Expression 9]}$$

$$i_{2phase} = \frac{T}{\sqrt{3} P_n \Psi_f} \frac{1}{\sin\left(\theta + \phi + \frac{\pi}{2}\right)} \quad \text{[Expression 10]}$$

In the two-phase energization control, the maximum current value limit is set as shown in Expression 11. The phase current is limited to the maximum current value, and the current $i_{2phase}$ is set as a pre-current command value with respect to the torque command value $T_{ref}$. More specifically, the U-phase pre-current command value $I_{pref\_u}$ is set to zero. The V-phase pre-current command value $I_{pref\_v}$ is assumed to be the $i_{2phase}$. The W-phase pre-current command value $I_{pref\_w}$ is set to −$i_{2phase}$. In this specification, a current command value before dither control described later is applied is referred to as a pre-current command value, and is distinguished from a current command value after dither control is applied.

The pre-current command value calculation unit 221a calculates and generates the pre-current command values $I_{pref\_v}$ and $I_{pref\_w}$ on the basis of a mathematical expression of Expression 11. The mathematical expression of Expression 11 represents the current $i_{2phase}$ by using a torque constant $K_t$ [Nm/Arms] represented by a mathematical expression of Expression 12.

$$i_{2phase} = \sqrt{\frac{3}{2}} \frac{T}{K_t} \frac{1}{\sin\left(\theta + \phi + \frac{\pi}{2}\right)} \quad \text{[Expression 11]}$$

$$K_t = \frac{3}{\sqrt{2}} P_n \Psi_f \quad \text{[Expression 12]}$$

The dither control unit 221b generates a current command value by applying dither control to the pre-current command value in a dead point range of an electrical angle range from 0 to 2π. The dither control unit 221b determines the pre-current command value as the current command value without applying dither control to the pre-current command value in a range other than the dead point range in the electrical angle range from 0 to 2π.

Figure 7A:
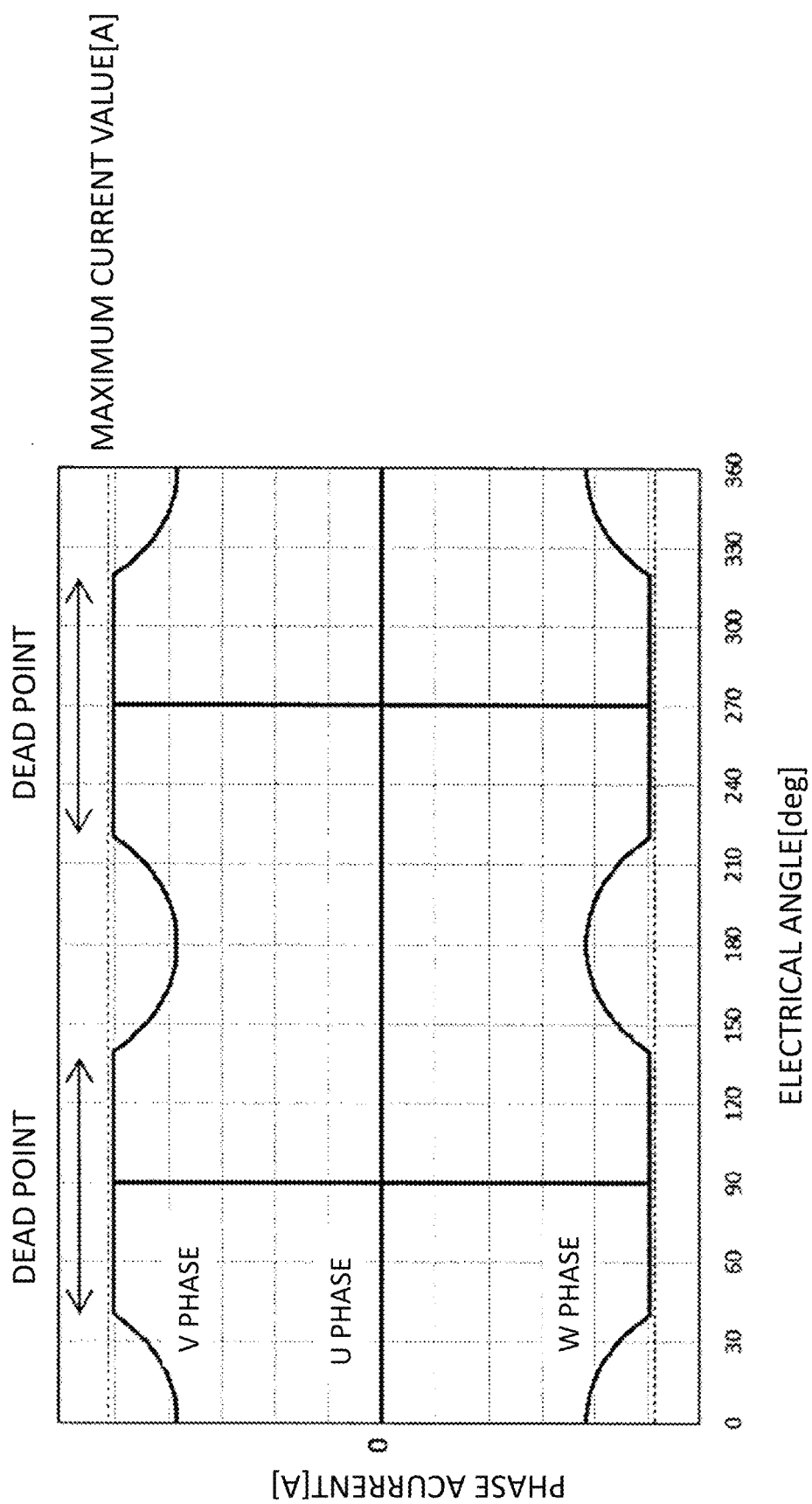
FIG. 7A is a graph exemplifying a phase current waveform by two-phase energization control at a time of U-phase failure.
Figure 7B:
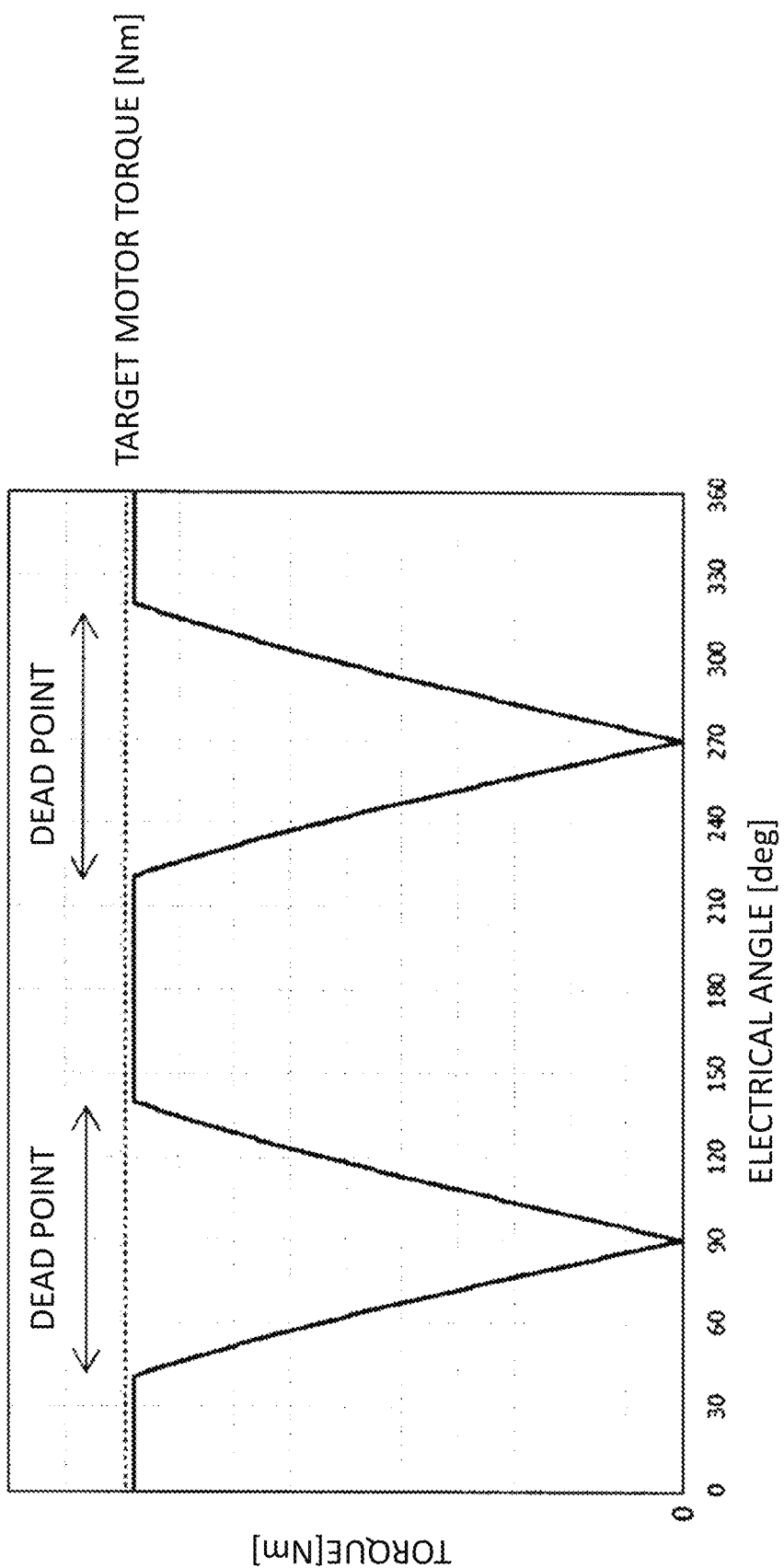
FIG. 7B is a graph exemplifying a motor torque waveform by the two-phase energization control at the time of U-phase failure.

FIG. 7A is a graph exemplifying a phase current waveform by two-phase energization control at the time of U-phase failure. FIG. 7B is a graph exemplifying a motor torque waveform by two-phase energization control at the time of U-phase failure. FIGS. 7A and 7B exemplify waveforms of the phase current and the motor torque to which the maximum current value limit is applied, respectively.

In the three-phase energization control and the two-phase energization control in the present embodiment, the phase current is controlled such that the sum of the phase currents becomes zero. In the two-phase energization control, the current flowing through the U-phase winding is always zero, so that an electrical angle at which the sum of the phase currents flowing through the V-phase and the W-phase is zero is generated. The dead point means this electrical angle. In FIG. 7A or 7B, the dead point is π/2 or (3/2)π.

The dead point range means a range of the dead point and electrical angles before and after the dead point. In the dead point range, even when the current is commanded, the current cannot flow to the motor, so that the motor torque falls below the torque command value (or a target motor torque). The dead point range includes the range of the electrical angle satisfying a condition of π/4≤θ+φ<(3/4)π or (5/4)π≤θ+φ<(7/4)π. In the present embodiment, in a case where the U phase fails, the phase offset φ is zero. The dead point range corresponds to the electrical angle range of π/4≤θ<(3/4)π or (5/4)π≤θ<(7/4)π.

As exemplified in FIG. 7B, the motor output significantly decreases near the dead point. A difference in motor torque between the dead point range and the range other than the dead point increases, and the variation amount of the torsion torque increases. This may be a factor that further deteriorates the steering feeling felt by the driver in a case where the steering angle of the steering wheel is to be maintained near the dead point.

The dither control unit 221b calculates a dither current $i_{Dither}$ on the basis of a mathematical expression of Expression 13, and generates the current command value $I_{ref}$ on the basis of the pre-current command value $I_{Pref}$ and the dither current $i_{Dither}$. Here, $A_{Dither}$ is a dither amplitude, and $f_{Dither}$ frequency. The dither current $i_{Dither}$ is represented by a periodic current waveform. The dither control unit 221b sets the dither current $i_{Dither}$ to zero in a range other than the dead point range as shown in a mathematical expression of Expression 14. Setting the dither current $i_{Dither}$ to zero means that substantially no dither control is applied.

$$i_{Dither} = \frac{1}{2} \left| A_{Dither} \sin\left\{2(\theta + \phi) + \frac{\pi}{2}\right\} \{\sin(2\pi f_{Dither} t) - 1\} \right| \quad \text{[Expression 13]}$$

$$i_{Dither} = 0 \quad \text{[Expression 14]}$$

Figure 8:
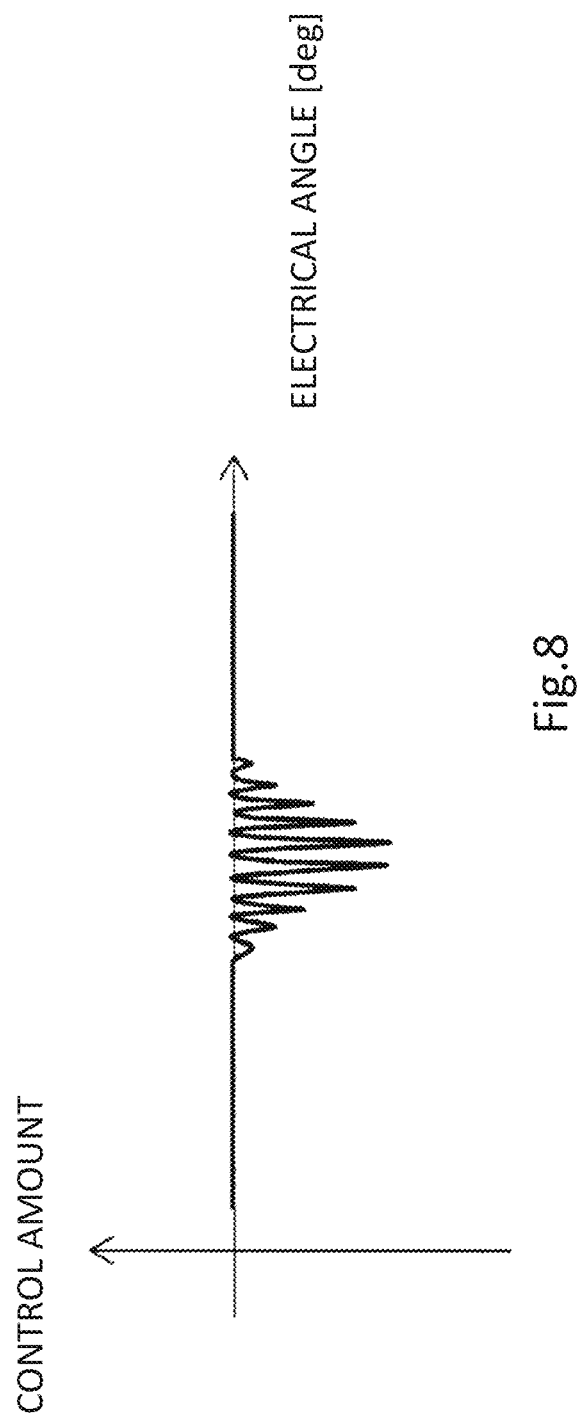
FIG. 8 is a graph illustrating an example of a dither current waveform according to the embodiment of the present disclosure.
Figure 9:
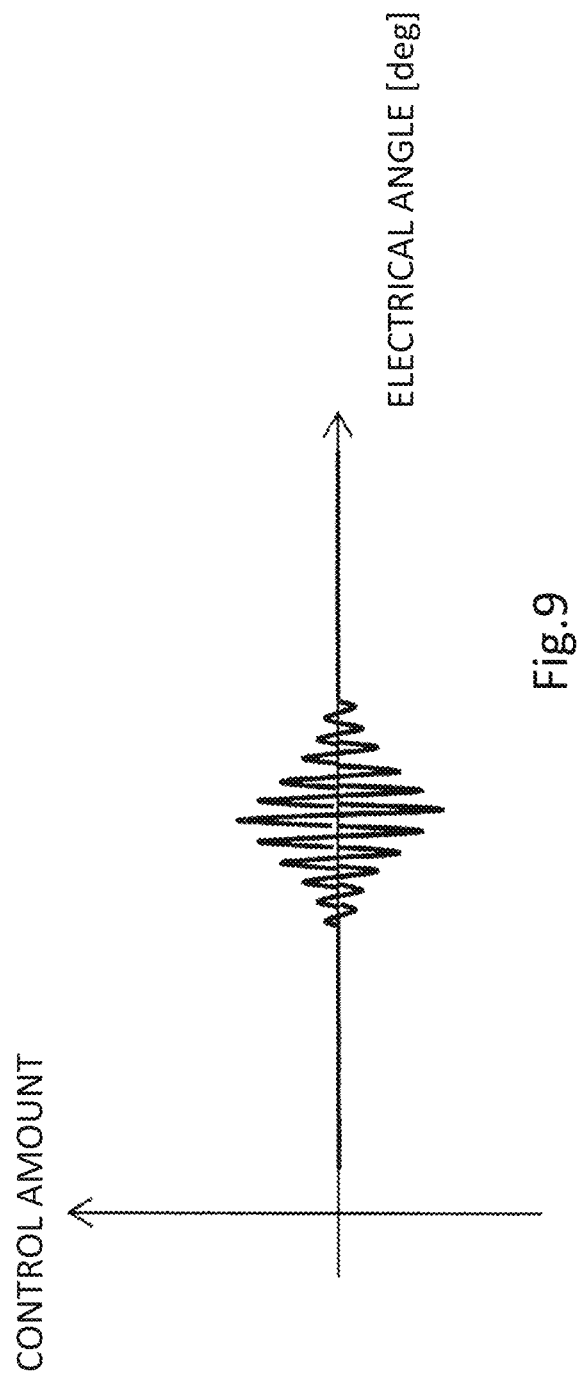
FIG. 9 is a graph illustrating a dither current waveform in a comparative example.

FIG. 8 is a graph illustrating an example of a dither current waveform in the present embodiment. FIG. 9 is a graph illustrating a dither current waveform in a comparative example. The dither current according to the comparative example is expressed by a mathematical expression of Expression 15. In the present embodiment, as compared with the dither current according to the comparative example, in the mathematical expression of Expression 13 for giving the dither current, (1) a point of taking the absolute value of the dither current (see FIG. 8) and (2) a point of adding "−1" as a bias to the output of the sin function of the last term of the right side are devised. This devising makes it possible to obtain the effect of the dither control in the dead point range.

$$i_{Dither} = A_{Dither} \sin\left\{2(\theta + \phi) + \frac{\pi}{2}\right\} \sin(2\pi f_{Dither} t) \quad \text{[Expression 15]}$$

The dither control unit 221b generates a current command value by subtracting the dither current from the pre-current command value when the pre-current command value is equal to or greater than zero, and generates a current command value by adding the dither current to the pre-current command value when the pre-current command value is less than zero. In other words, the dither control unit 221b generates the current command value on the basis of a mathematical expression of Expression 17 when the condition shown in Expression 16 is satisfied, and generates the current command value on the basis of a mathematical expression of Expression 18 when the condition shown in Expression 16 is not satisfied.

$$i_{2phase} \geq 0 \quad \text{[Expression 16]}$$

$$i_{2phase\_Dither} = i_{2phase} - i_{Dither} \quad \text{[Expression 17]}$$

$$i_{2phase\_Dither} = i_{2phase} + i_{Dither} \quad \text{[Expression 18]}$$

The dither control unit 221b outputs three-phase current command values $I_{ref\_u}$, $I_{ref\_v}$, and $I_{ref\_w}$ after applying the dither control, which are given by a mathematical expression of Expression 19. Incidentally, the U-phase current command value $I_{ref\_u}$ at the time of the U-phase failure is zero.

$$I_{ref\_u}=0, I_{ref\_v}=i_{2phase\_Dither}, I_{ref\_w}=-i_{2phase\_Dither} \quad \text{[Expression 19]}$$

Figure 10:
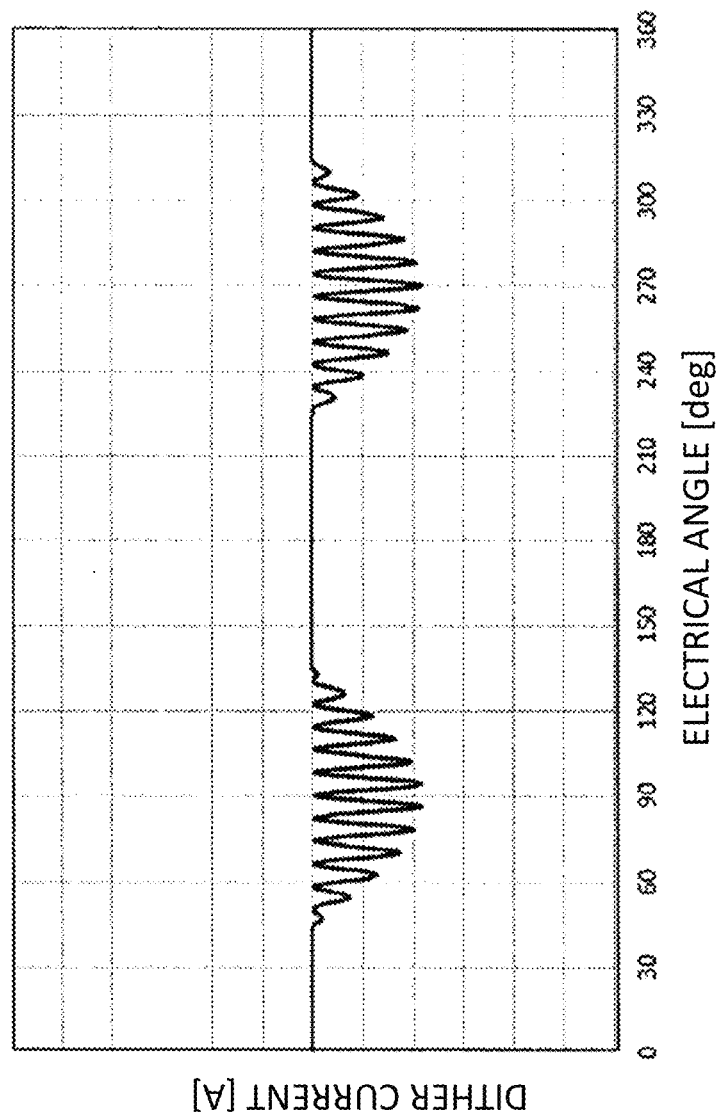
FIG. 10 is a graph exemplifying the dither current waveform used for dither control.
Figure 11:
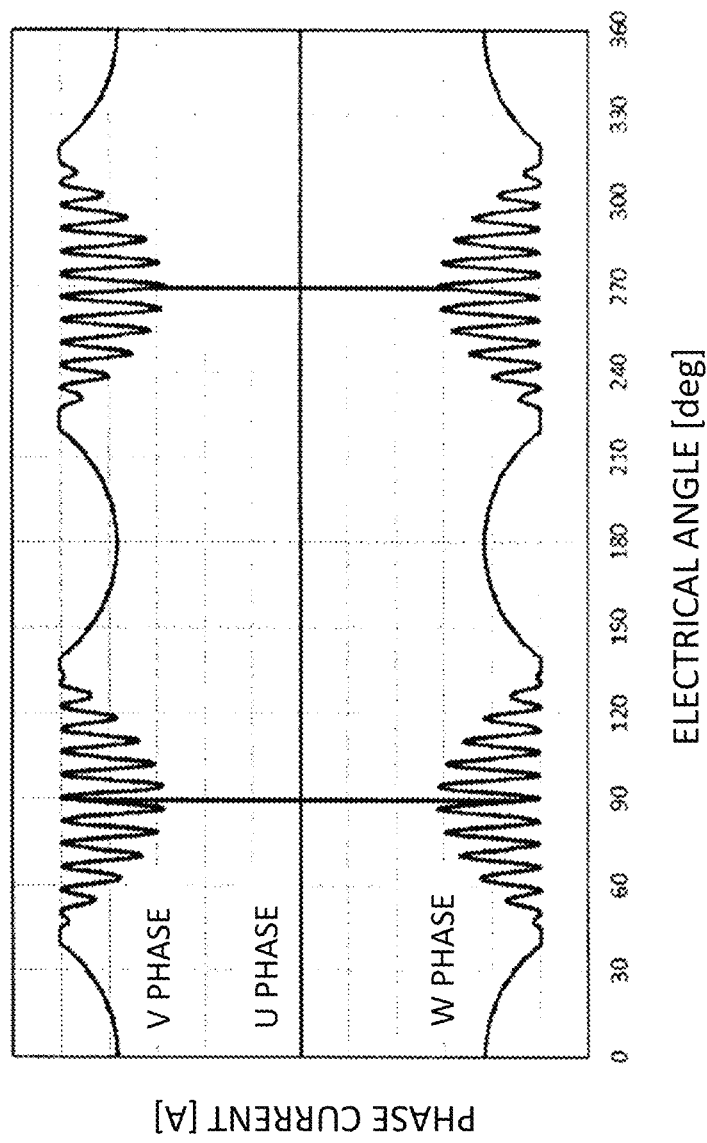
FIG. 11 is a graph exemplifying a phase current waveform after the dither control is applied to a phase current in which chattering occurs.

FIG. 10 is a graph exemplifying a dither current waveform used for the dither control. FIG. 11 is a graph exemplifying a phase current waveform after the dither control is applied to a phase current in which chattering occurs.

As described above, the current limitation is applied in the two-phase energization control. Thus, even when the dither current according to the comparative example is applied to the pre-current command value, the suppression of current chattering becomes insufficient, and as a result, there is a problem that the effect of the dither control cannot be obtained. On the other hand, when the dither current according to the present embodiment is applied to the pre-current command value, the current chattering is appropriately suppressed, and as a result, the effect of the dither control can be obtained sufficiently.

FIG. 5 is referred to again.

The voltage command value calculation unit 222 acquires the current command values $I_{ref\_u}$, $I_{ref\_v}$, and $I_{ref\_w}$. The voltage command value calculation unit 222 calculates the voltage command values $V_{ref\_u}$, $V_{ref\_v}$, and $V_{ref\_w}$ on the basis of the current command values $I_{ref\_u}$, $I_{ref\_v}$, and $I_{ref\_w}$. In the two-phase energization control at the time of the U-phase failure, $V_{ref\_u}$ is zero.

The PWM modulation unit 223 acquires the voltage command values $V_{ref\_u}$, $V_{ref\_v}$, and $V_{ref\_w}$. The PWM modulation unit 223 calculates the duty command values $Duty_u$, $Duty_v$, and $Duty_w$ on the basis of the voltage command values $V_{ref\_u}$, $V_{ref\_v}$, and $V_{ref\_w}$, and outputs the duty command values $Duty_u$, $Duty_v$, and $Duty_w$ to the drive circuit 115.

The present inventors confirmed the effect obtained by applying the dither control to the pre-current command value by performing actual vehicle measurement. In the actual vehicle measurement, the effect of the dither control was measured when the two-phase energization control was performed, and the application of the dither control was switched from off to on when chattering occurs in the current in the dead point range.

The conditions of the actual vehicle measurement are as follows: (1) torque constant $K_t$: 0.0452 [Nm/Arms], (2) number of pole pairs Pn: 4, (3) dither amplitude $A_{Dither}$: 2 [Nm], (4) dither frequency $f_{Dither}$: 30 [Hz], and (5) type of motor: brushless motor. The dither amplitude $A_{Dither}$ and the dither frequency $f_{Dither}$ are set as variables, and can be appropriately determined depending on the type of a vehicle or motor on which the EPS is mounted.

Figure 12:
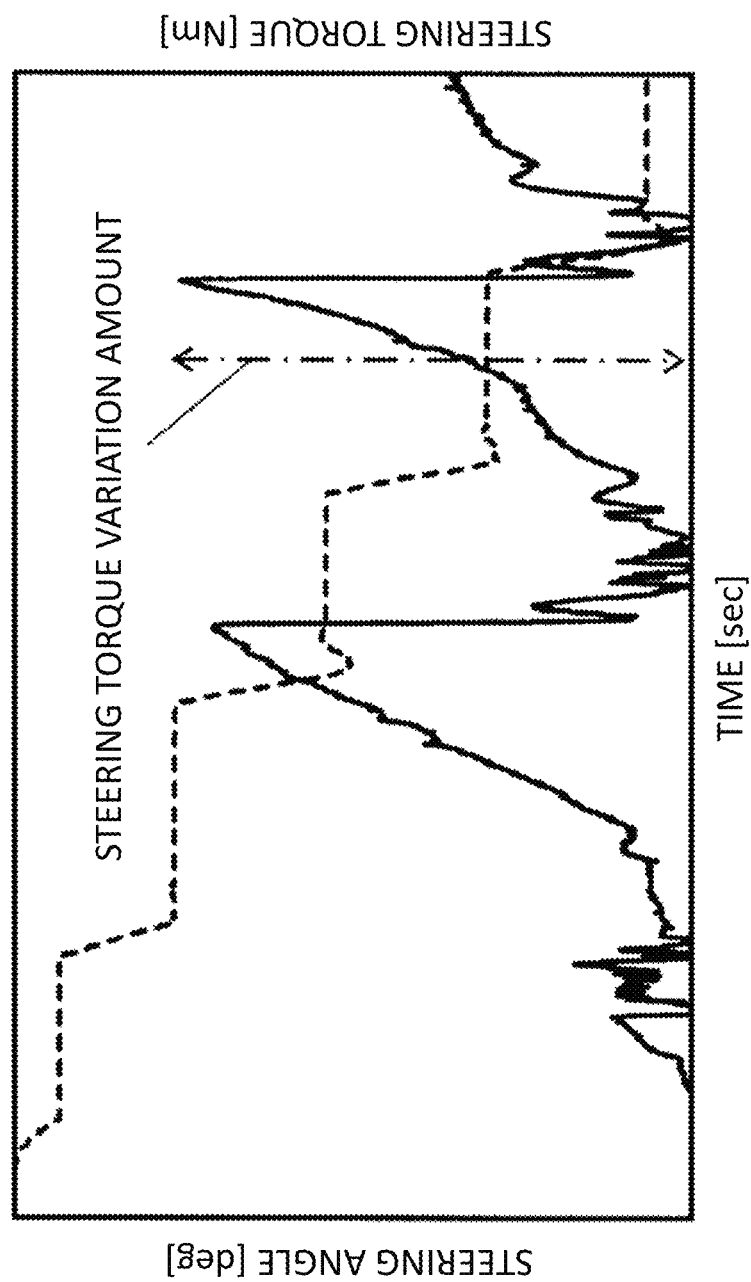
FIG. 12 is a graph illustrating measurement results of a steering angle and a steering torque in a case where the dither control is not applied.
Figure 13:
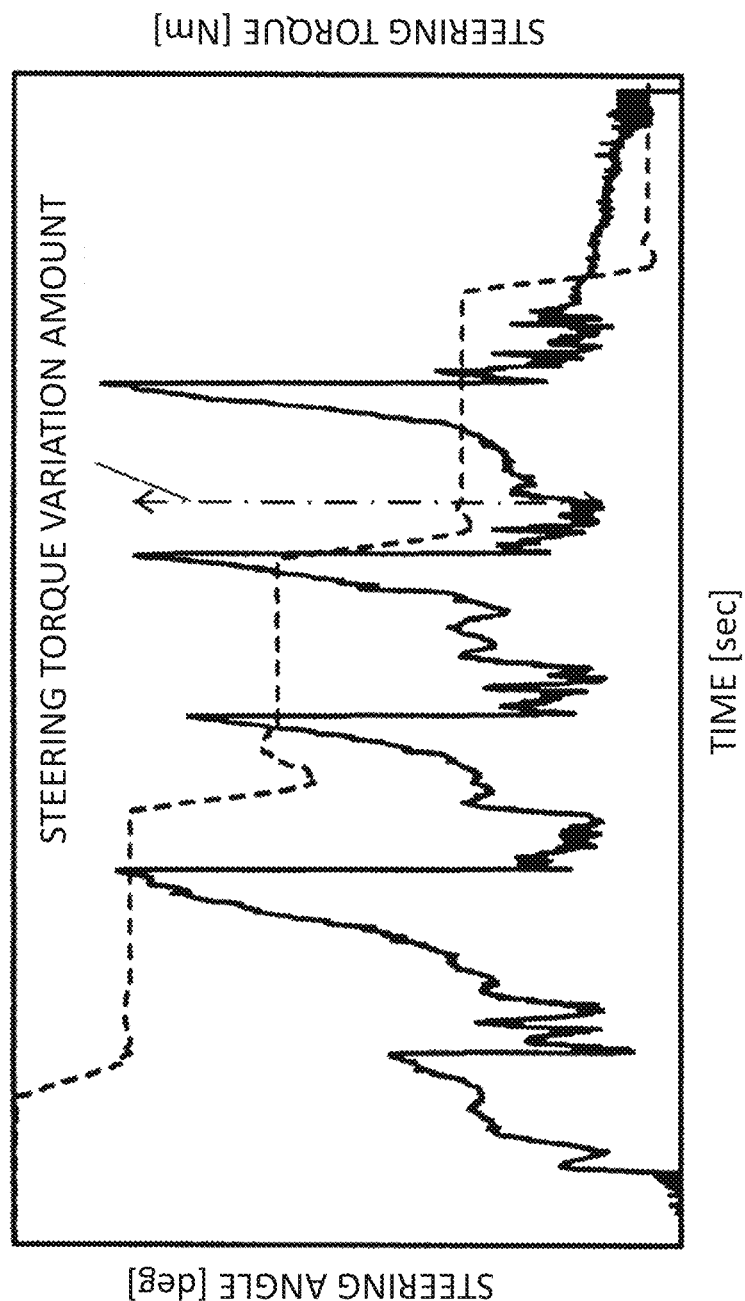
FIG. 13 is a graph illustrating measurement results of the steering angle and the steering torque in a case where the dither control is applied.

FIG. 12 is a graph illustrating measurement results of a steering angle and a steering torque in a case where the dither control is not applied. FIG. 13 is a graph illustrating measurement results of the steering angle and the steering torque in a case where the dither control is applied. In the graph, a broken line indicates the steering angle [deg], and a solid line indicates the steering torque [Nm].

Compared with a case where the dither control was not applied, the current chattering was suppressed in a case where the dither control was applied. As a result, it has been found that the vibration of the steering wheel was also suppressed, and specifically, the variation amount of the steering torque decreased by about 5 [Nm].

According to the motor control device 100 of the present embodiment, it is possible to improve the steering feeling felt by the driver when the energization control of energizing the remaining windings of the normal phase is performed in a case where the energization failure occurs in any phase of the windings of the motor. For example, it is possible to suppress the current chattering in the vicinity of the dead point, which may occur when the two-phase energization control is performed, and to reduce the steering torque variation amount. These effects can contribute to improvement in the safety of a steering wheel operation.

The motor control device or the control method according to the present embodiment can also be used as a control device for a double winding motor capable of performing so-called double inverter drive in which the motor is driven using two inverters. For example, in a case where a U-phase in one of the two inverters fails, it is possible to continuously perform two-phase energization control of energizing V-phase and W-phase windings by using the two inverters.

The embodiments of the present disclosure can be used for a motor control device for controlling an EPS mounted on a vehicle.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control device, which is used in an electric power steering apparatus including a motor having n-phase (n is an integer of three or more) windings, for controlling the motor, wherein n-phase energization control of energizing the n-phase windings or n−1 phase energization control of energizing n−1 phase windings is able to be performed, the control device comprising:

a processor; and a memory that stores a program for controlling an operation of the processor, wherein the processor executes according to the program switching from the n-phase energization control to the n−1 phase energization control in response to a switching signal, acquiring a torque command value, an electrical angle of the motor, and an actual current value of the motor, generating a pre-current command value on a basis of the torque command value, the electrical angle of the motor, and the actual current value of the motor which are acquired, generating a current command value by applying dither control to the pre-current command value in a dead point range of an electrical angle range from 0 to $2\pi$, and performing the n−1 phase energization control on a basis of the current command value.

2. The control device according to claim 1, wherein the processor determines the pre-current command value as the current command value without applying dither control to the pre-current command value in a range other than the dead point range in the electrical angle range from 0 to $2\pi$.

3. The control device according to claim 1, wherein the dead point range includes a range of an electrical angle satisfying a condition of $\pi/4 \leq \theta+\varphi < (3/4)\pi$ or $(5/4)\pi \leq \theta+\varphi < (7/4)\pi$, where $\theta$ is the electrical angle, and $\varphi$ is a phase offset.

4. The control device according to claim 3, wherein the processor calculates a dither current on a basis of a mathematical expression of Expression 1, and generates the current command value on a basis of the pre-current command value and the dither current, $$i_{Dither} = \frac{1}{2}\left|A_{Dither}\sin\{2(\theta+\phi)+\frac{\pi}{2}\}\{\sin(2\pi f_{Dither}t)-1\}\right| \quad \text{[Expression 1]}$$

where $i_{Dither}$ is the dither current, $A_{Dither}$ is a dither amplitude, and $f_{Dither}$ is a dither frequency.

5. The control device according to claim 4, wherein the processor generates the current command value by subtracting the dither current from the pre-current command value when the pre-current command value is equal to or greater than zero, and generates the current command value by adding the dither current to the pre-current command value when the pre-current command value is less than zero.

6. The control device according to claim 1, wherein the processor further executes acquiring a torsion torque, generating a phase compensation torque by applying a first-order phase compensation to the torsion torque when a steering frequency is within a predetermined range, and generating the torque command value on a basis of the phase compensation torque.

7. The control device according to claim 6, wherein the first-order phase compensation is represented by a transfer function of a mathematical expression of Expression 2,

[Expression 2]

$$C(s) = \frac{\frac{1}{2\pi f_1}s+1}{\frac{1}{2\pi f_2}s+1}$$

where s is a Laplace transformer, $f_1$ is a frequency of a zero point of the transfer function, and $f_2$ is a frequency of a pole of the transfer function.

8. The control device according to claim 6, wherein the processor calculates a differential compensation torque on a basis of a temporal change amount of the torsion torque, and generates the torque command value on a basis of the phase compensation torque and the differential compensation torque.

9. The control device according to claim 1, wherein the processor monitors whether or not there is a winding incapable of being energized among the n-phase windings, generates the switching signal in response to detecting the winding incapable of being energized, and performs the n−1 phase energization control by energizing the n−1 phase windings other than the winding incapable of being energized among the n-phase windings.

10. A motor module comprising:

a motor; and the control device according to claim 1.

11. An electric power steering apparatus comprising the motor module according to claim 10.

12. A control method, which is used in an electric power steering apparatus including a motor having n-phase (n is an integer of three or more) windings, for controlling the motor, wherein n-phase energization control of energizing the n-phase windings or n−1 phase energization control of energizing n−1 phase windings is able to be applied to the motor, the control method comprising:

switching from the n-phase energization control to the n−1 phase energization control in response to a switching signal;

acquiring a torque command value, an electrical angle of the motor, and an actual current value of the motor;

generating a pre-current command value on a basis of the torque command value, the electrical angle of the motor, and the actual current value of the motor which are acquired;

generating a current command value by applying dither control to the pre-current command value in a dead point range of an electrical angle range from 0 to $2\pi$; and performing the n−1 phase energization control on a basis of the current command value.

\* \* \* \* \*